Figure 1:
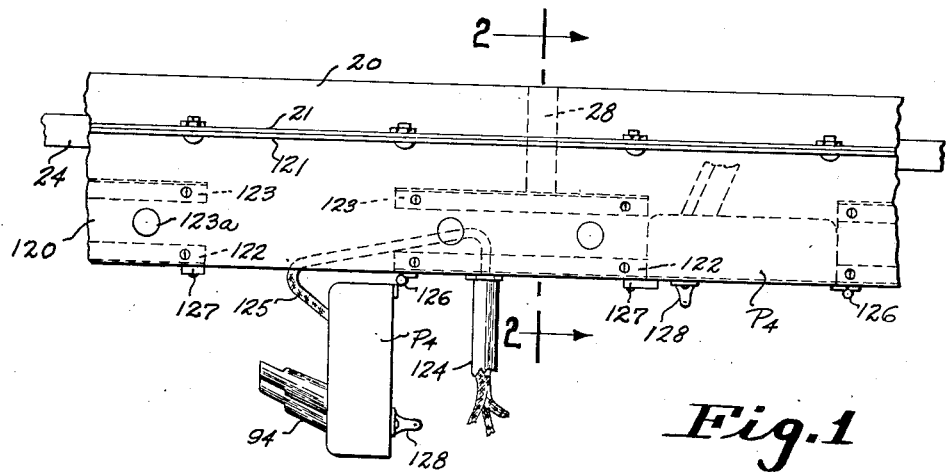

Feb. 14, 1939.  W. H. FRANK ET AL  2,146,812
ELECTRICAL DISTRIBUTION SYSTEM
Original Filed Oct. 9, 1933

Patented Feb. 14, 1939

2,146,812

UNITED STATES PATENT OFFICE 2,146,812

ELECTRICAL DISTRIBUTION SYSTEM

William H. Frank and Joseph W. Harper, Detroit, Mich., assignors to Bulldog Electric Products Company, Detroit, Mich., a corporation of West Virginia Original application October 9, 1933, Serial No. 692,910, now Patent No. 2,041,675, dated May 19, 1936. Divided and this application January 29, 1936, Serial No. 61,290

4 Claims. (Cl. 247—3)

This application relates to electrical distribution systems of the bus duct and plug type and is a divisional of our prior application Serial No. 692,910 of October 9, 1933 now Patent #2,041,675, May 19, 1936.

One of the features of the system herein disclosed is a supplementary duct construction. The duct is formed of two pans or halves joined by means of side flanges and containing bus bars, and in the construction herein disclosed the lower pan is equipped with hingedly mounted plugs whose prongs are adapted to make contact with the bus bars, the plugs partially filling the lower pan. The balance of the lower pan is used as a conductor gutter and also as a connection means for branch circuit conductors.

Figure 2:
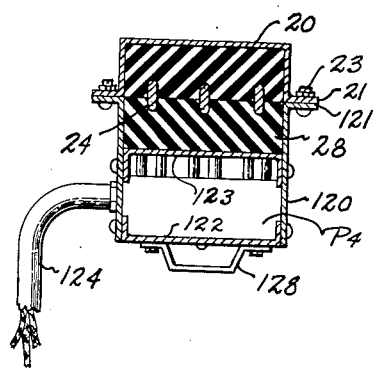

Still further features of construction will be readily apparent upon reference to the appended drawing. In the drawing, Fig. 1 is a fragmentary side elevational view of an electrical distribution system, shown with current take-off devices in place;

Fig. 2 is a sectional view, as if on line 2—2 of Fig. 1.

In Figs. 1 and 2, there is shown a duct run which includes a casing whose upper part is a flanged pan 20, and whose lower part includes two separated side plates 120, having flanged edges 121 secured to the flanged edges 21 of the upper casing part 20 by bolts 23 passed through the flanges 21—121. At intervals, the lower portions of these plates 120 are connected by lower and intermediate cross plates 122, 123, bolted to the side plates 120, the space between the cross plates and the side plates being in the nature of a wiring space. The plates 120—122, at suitable points, are provided with removable "knock-outs" 123a at these wiring spaces, through which may be introduced branch circuit rigid conduits 124 whose cables 125 pass into the wiring spaces. Hingedly secured to the plates 122 at their edges 126 are plug-in devices P4 having contact arrangements 94 for engagement with bus bars 24 in the duct run, and these plug-in devices bridge the gaps between the longitudinally spaced plates 122, and form with these plates, a continuous bottom closure for the wiring space through which the wires 125 from the rigid conduits 124 pass to the plug-in devices P4. Rotatable clips 127 aid in maintaining the plugs P4 in place in the duct run.

The construction of Figs. 1—2 may be regarded as a combined bus bar and wiring duct construction.

It will be observed that the rigid conduits 124 may be connected to the wiring space through any one of three walls 120—120—122 and at spaced points.

The plug-in devices P4, are provided with pull out handles 128 which aid in moving the plug-in devices to and from the duct run for switching action, after the clips 127 are rotated for release.

We claim:

1. A bus duct system comprising a duct having bus bars therein, and provided with large holes in a wall thereof, branch circuit conductors outside the duct and having terminals entering the duct through holes other than the large holes aforementioned, the terminals having flexible portions within the duct, branch circuit plugs within the duct and filling said large holes and providing covers therefor and having contacts for engaging the bus bars, the flexible conductor portions within the duct being connected within the duct to the plug contacts.

2. A bus duct system comprising a duct having bus bars therein, and provided with large holes in a wall thereof, branch circuit conductors outside the duct and having terminals entering the duct, through holes other than the large holes aforementioned, the terminals having flexible portions within the duct, branch circuit plugs within the duct and filling said large holes and providing covers therefor and having contacts for engaging the bus bars, the flexible conductor portions within the duct being connected within the duct to the plug contacts, the plugs being hingedly mounted to the duct by hinges at the edges of said large holes thereof whereby they may be swung into and out of the duct.

3. A bus duct system comprising a duct having bus bars therein, and provided with large holes in a wall thereof, branch circuit conductors outside the duct and having terminals entering the duct, through holes other than the large holes aforementioned, the terminals having flexible portions within the duct, branch circuit plugs within the duct and filling said large holes and providing covers therefor and having contacts for engaging the bus bars, the flexible conductor portions within the duct being connected within the duct to the plug contacts, the exposed surfaces of the plugs, when these are within the duct, being substantially flush with that wall of the duct provided with the plug receiving holes.

4. A bus duct system comprising a duct having bus bars therein, and provided with large holes in a wall thereof, branch circuit conductors outside the duct and having terminals entering the duct, through holes other than the large holes aforementioned, the terminals having flexible portions within the duct, branch circuit plugs within the duct and filling said large holes and providing covers therefor and having contacts for engaging the bus bars, the flexible conductor portions within the duct being connected within the duct to the plug contacts, the plugs being hingedly mounted to the duct by hinges at the edges of said large holes thereof whereby they may be swung into and out of the duct, the exposed surfaces of the plugs, when these are within the duct, being substantially flush with that wall of the duct provided with the plug receiving holes.

WILLIAM H. FRANK.
JOSEPH W. HARPER.